US011166619B2

(12) United States Patent
Buesing et al.

(10) Patent No.: US 11,166,619 B2
(45) Date of Patent: Nov. 9, 2021

(54) ROLLER, METHOD OF MANUFACTURING THE SAME, AND DISH WASHER HAVING THE SAME

(71) Applicant: Samsung Electronics Co., Ltd., Suwon-si (KR)

(72) Inventors: Johannes Buesing, Suwon-si (KR); Ki Tae Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 195 days.

(21) Appl. No.: 16/502,597

(22) Filed: Jul. 3, 2019

(65) Prior Publication Data
US 2020/0015654 A1   Jan. 16, 2020

(30) Foreign Application Priority Data

Jul. 13, 2018 (KR) ........................ 10-2018-0081373

(51) Int. Cl.
| A47L 15/50 | (2006.01) |
| B29L 31/32 | (2006.01) |
| B29C 45/44 | (2006.01) |

(52) U.S. Cl.
CPC ........ *A47L 15/507* (2013.01); *B29C 45/4407* (2013.01); *B29L 2031/322* (2013.01)

(58) Field of Classification Search
CPC .... A47L 15/507; A47L 15/503; A47L 15/504; A47L 15/50; A47L 15/501;
(Continued)

(56) References Cited

U.S. PATENT DOCUMENTS 3,672,743 A * 6/1972 Pompey ............... B60B 33/0063
312/352
3,726,581 A * 4/1973 Doepke ................. A47L 15/504
312/351
(Continued)

FOREIGN PATENT DOCUMENTS

| DE | 39 27 214 | 2/1991 | |
| DE | 19843277 A1 * | 3/2000 | ............ F16C 13/006 |

(Continued)

OTHER PUBLICATIONS

International Search Report dated Oct. 23, 2019 in International Patent Application PCT/KR2019/008119.
(Continued)

*Primary Examiner* — Hiwot E Tefera
(74) *Attorney, Agent, or Firm* — Staas & Halsey LLP

(57) ABSTRACT

A roller is capable of smoothly rotating without any burr on a rolling surface. A dish washer including the roller includes: a case; a basket configured to accommodate dishes; a rail configured to guide the basket to be put into or taken out of the case; and a basket roller coupled with the basket and configured to move along the rail, the basket roller comprising a rolling portion configured to roll in contact with the rail, a first flare portion extending in a first direction from the rolling portion, and a second flare portion extending in a second direction from the rolling portion, the second direction being opposite to the first direction, wherein a diameter of the first flare portion is greater than a diameter of the second flare portion.

17 Claims, 16 Drawing Sheets

(58) Field of Classification Search
CPC .......... B29C 46/4407; B29C 2031/322; B29C 45/0025; B29C 2045/0034; B29K 2995/0046; B29L 2031/322; A47B 2210/0059; A47B 2210/04; A47B 2210/17; A47B 88/493

See application file for complete search history.

(56) References Cited

U.S. PATENT DOCUMENTS

| | | | | |
|---|---|---|---|---|
| 3,736,037 | A | * | 5/1973 | Doepke ................. A47B 51/00 312/351 |
| 3,829,191 | A | * | 8/1974 | Jenkins ................ A47B 88/437 312/228.1 |
| 3,851,943 | A | * | 12/1974 | Afful .................... A47L 15/507 312/228.1 |
| 3,982,802 | A | * | 9/1976 | Bailey .................. A47L 15/507 312/228.1 |
| 5,165,142 | A | | 11/1992 | Pilsbury |
| 5,474,378 | A | * | 12/1995 | Smith .................. A47L 15/504 312/334.4 |
| 7,651,180 | B2 | | 1/2010 | Deiss et al. |
| 2005/0039782 | A1 | * | 2/2005 | Kim ..................... A47L 15/504 134/58 D |
| 2016/0036946 | A1 | | 12/2016 | Shewmaker |
| 2018/0035866 | A1 | * | 2/2018 | Nowell, Jr. ......... A47L 15/4285 |
| 2019/0261829 | A1 | * | 8/2019 | Racs ..................... A47L 15/50 |

FOREIGN PATENT DOCUMENTS

| | | |
|---|---|---|
| DE | 101 63 875 | 7/2003 |
| EP | 0 993 931 | 4/2000 |
| EP | 1 602 317 | 12/2005 |
| JP | 6-198382 | 7/1994 |
| KR | 10-2004-0047014 | 6/2004 |
| KR | 10-2006-0100597 | 9/2006 |

OTHER PUBLICATIONS

European Search Report for corresponding European Patent Application No. 19834582.9 dated Mar. 25, 2021.

* cited by examiner

ROLLER, METHOD OF MANUFACTURING THE SAME, AND DISH WASHER HAVING THE SAME

CROSS-REFERENCE TO RELATED APPLICATIONS

This application is based on and claims priority under 35 U.S.C. § 119 to Korean Patent Application No. 10-2018-0081373, filed on Jul. 13, 2018 in the Korean Intellectual Property Office, the disclosure of which is incorporated by reference herein in its entirety.

BACKGROUND

1. Field

The disclosure relates to a roller, a method of manufacturing the same, and a dish washer having the roller.

2. Description of the Related Art

A dish washer is a machine for automatically washing off food residues, etc. on dishes with a detergent and water.

In general, a dish washer includes a case having an opening in the front side, a door for opening or closing the opening of the case, a basket for accommodating dishes and configured to be taken out of or put into the case, and a spray nozzle for spraying water. Also, the dish washer includes rails provided in the inside of the case and guiding the basket to be put into or taken out of the case, and rollers rotating along the rails and supporting movements of the basket.

Generally, the rollers are integrated type rollers or combined type rollers. The combined type rollers are manufactured by combining two parts in the axial direction, and the integrated type rollers are manufactured by injection-molding.

The combined type rollers have lower durability than the integrated type rollers.

In the integrated type rollers, a burr formed by injection molding is positioned on the rolling surfaces. Because the burr is formed on the rolling surfaces of the rollers, the rollers move up and down due to the burr when rotating. That is, the burr interferes with smooth rotations of the rollers, and also prevents the basket from being smoothly put into or taken out of the case.

SUMMARY

Therefore, it is an aspect of the disclosure to provide a roller capable of rotating smoothly without any burr on a rolling surface, a method of manufacturing the roller, and a dish washer including the roller.

It is an aspect of the disclosure to provide a roller capable of rotating smoothly due to its asymmetrical structure even when an error is generated upon assembly of the roller, a method of manufacturing the roller, and a dish washer including the roller.

Additional aspects of the disclosure will be set forth in part in the description which follows and, in part, will be obvious from the description, or may be learned by practice of the disclosure.

In accordance with an aspect of the disclosure, a dish washer includes: a case; a basket configured to accommodate dishes; a rail configured to guide the basket to be put into or taken out of the case; and a basket roller coupled with the basket and configured to move along the rail, the basket roller comprising a rolling portion configured to roll in contact with the rail, a first flare portion extending in a first direction from the rolling portion, and a second flare portion extending in a second direction from the rolling portion, the second direction being opposite to the first direction, wherein a diameter of the first flare portion is greater than a diameter of the second flare portion.

The basket roller may include a burr, and the burr may be formed along a circumferential direction of the first flare portion.

The diameter of the first flare portion may increase toward the first direction from the rolling portion, and the diameter of the second flare portion may increase toward the second direction from the rolling portion.

The rolling portion, the first flare portion, and the second flare portion may be integrated into one body.

The burr may be formed at one end of the first flare portion.

The first flare portion and the second flare portion may have curvatures, respectively, and the curvature of the first flare portion may be greater than the curvature of the second flare portion.

The basket roller may include: a shaft coupler in which a shaft of the basket roller is inserted; a first recess recessed in the second direction between the first flare portion and the shaft coupler; and a second recess recessed in the first direction between the second flare portion and the shaft coupler.

The basket roller may further include a plurality of ribs connecting the first flare portion to the shaft coupler and functioning to reinforce strength of the first flare portion, the plurality of ribs being spaced from each other along a circumferential direction of the shaft coupler.

A thickness of the second flare portion may be smaller at a longer distance in the second direction from the rolling portion, or the thickness of the second flare portion may be uniform.

The basket roller may be manufactured by injection-molding.

An inner surface of the second flare portion forming the second recess may be inclined with respect to the first direction.

The dish washer may further include a rail roller rotatably coupled with an inner wall of the case, wherein the rail roller may be configured to rotate between an upper surface of the rail and a lower surface of the rail to move the rail.

The dish washer may further include a first stopper and a second stopper respectively positioned at a first end and a second end of the rail, and the first stopper and the second stopper may be configured to limit movement ranges of the basket roller and the rail roller.

When the basket is taken out of the case, the basket first may move until the basket roller contacts the first stopper, and then move until the rail roller contacts the second stopper.

In accordance with an aspect of the disclosure, a roller of moving along a rail includes: a rolling portion configured to roll in contact with the rail; a first flare portion with a greater diameter at a longer distance in a first direction from the rolling portion; a second flare portion with a greater diameter at a longer distance in a second direction from the rolling portion, the second direction being opposite to the first direction; and a burr formed along a circumferential direction of the first flare portion.

The diameter of the first flare portion may be greater than the diameter of the second flare portion.

The burr may be formed at one end of the first flare portion to be in non-contact with the rail when the roller moves along the rail.

An upper surface or a lower surface of the rail may be curved to correspond to the rolling portion.

The first flare portion and the second flare portion may have curvatures, respectively, and the curvature of the first flare portion may be greater than the curvature of the second flare portion.

In accordance with an aspect of the disclosure, a method of manufacturing a roller includes: closing a first mold, a second mold forming a parting line at one end of the roller together with the first mold, and a core; injecting a molten material into an injection space formed between the first mold, the second mold, and the core; separating the first mold from the second mold in a first direction that is parallel to a rotation axis of the roller such that a burr is formed along a circumferential direction of the roller; separating the core from the second mold in a second direction that is opposite to the first direction; and forcibly picking out a roller as an injection-molding product in the first direction from the second mold.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
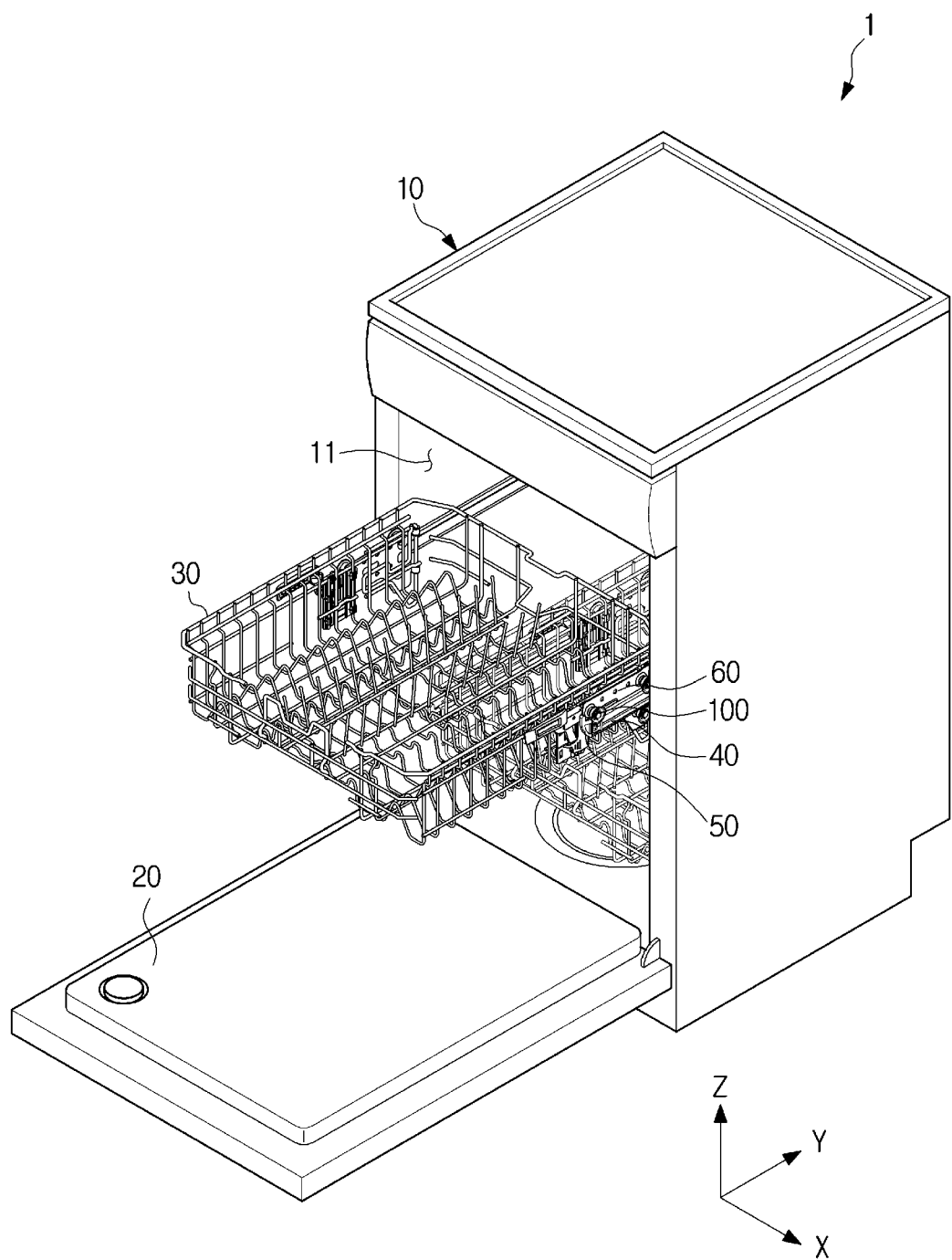
FIG. 1 is a perspective view of a dish washer according to an embodiment of the disclosure.

Reference will now be made in detail to the embodiments, examples of which are illustrated in the accompanying drawings, wherein like reference numerals refer to like elements throughout. The embodiments are described below to explain the disclosure by referring to the figures.

Configurations illustrated in the embodiments and the drawings described in the present specification are only embodiments of the disclosure, and thus it is to be understood that various modified examples, which may replace the embodiments and the drawings described in the present specification, are possible when filing the present application.

The terms used in the present specification are merely used to describe particular embodiments, and are not intended to limit the disclosure. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, components, or combination thereof, but do not preclude the presence or addition of one or more other features, figures, steps, components, members, or combinations thereof.

It will be understood that, although the terms "first," "second," etc. may be used herein to describe various components, these components should not be limited by these terms. These terms are only used to distinguish one component from another. For example, a first component could be termed a second component, and, similarly, a second component could be termed a first component, without departing from the scope of the disclosure.

Hereinafter, the disclosure will be described in detail with reference to the accompanying drawings. Meanwhile, in the current specification, a roller may indicate a basket roller. The basket roller may be a roller positioned on an outer surface of a rail and configured to move along an upper or lower surface of the rail.

FIG. 1 is a perspective view of a dish washer according to an embodiment of the disclosure.

As shown in FIG. 1, a dish washer 1 may include a case 10 having an opening 11 in the front side, a door 20 configured to close or open the opening of the case 10, a basket 30 accommodating dishes and configured to be put into or taken out of the case 10, a rail 40 configured to guide movements of the basket 30, and a basket roller 100 rotatably coupled with the basket 30 and configured to move along the rail 40.

The dish washer 1 may close the door 20 and then wash dishes accommodated in the basket 30 with a detergent and water. The dish washer 1 may further include various components, such as a spray nozzle (not shown) for spraying water, which will be described in detail, later.

When the basket 30 is taken out of or put into the case 10, the basket 30 may need to move smoothly. For this, the basket roller 100 rested on the rail 40 may need to rotate smoothly.

Typically, a burr is formed on the rolling surface of a roller and may interfere with smooth rotations of the roller. The burr is a kind of protrusion that is necessarily formed along a parting line upon injection-molding. When the burr is formed on the rolling surface of the roller, the roller moves up and down due to the burr when rotating, which interferes with smooth rotations of the roller. As described above, when a roller is manufactured by injection-molding, a burr is necessarily formed. Therefore, the burr may need to be formed at an area other than the rolling surface of the roller.

The roller according to an embodiment of the disclosure may be used in various home appliances or furniture using rails and rollers, as well as a dish washer. Hereinafter, a dish washer will be described as an example.

Figure 2:
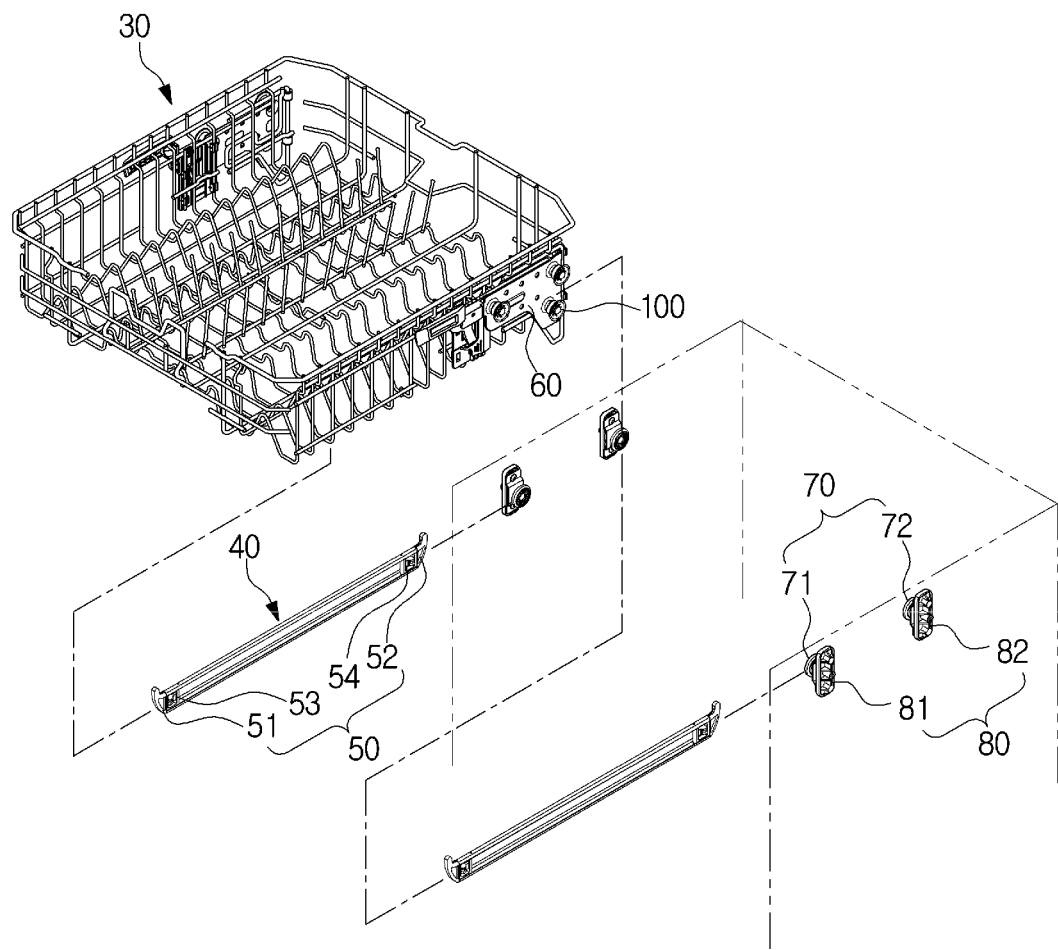
FIG. 2 shows a basket, rails and rollers in a dish washer according to an embodiment of the disclosure.

FIG. 2 shows a basket, rails and rollers in a dish washer according to an embodiment of the disclosure.

As shown in FIG. 2, a bracket 60 may be installed on the basket 30. The basket roller 100 may be rotatably coupled with the bracket 60. The basket roller 100 may rotate on an outer surface of the rail 40 in contact with the outer surface of the rail 40. When the basket roller 100 rotates, the basket 30 may move forward or backward with respect to the rail 40.

A plurality of rail rollers 70, including first rail roller 71 and second rail roller 72, may be provided in the inside of the rail 40 in such a way to be rotatable with respect to the rail 40. The rail 40 may include a plurality of stoppers 50 including stoppers 51, 52, 53, and 54 positioned at both ends of the rail 40 to limit moving ranges of the basket roller 100 and the rail roller 70.

The rail roller 70 may be fixed on an inner wall of the case 10 through a plurality of roller fixing members 80, including first roller fixing member 81 and second roller fixing member 82. Because the rail roller 70 is fixed on the inner wall of the case 10, movements of the rail roller 70 may be limited. The rail roller 70 may be rotatable on its rotation shaft, and when the rail roller 70 rotates, the rail 40 may move forward or backward, which will be described in detail, later.

Figure 3:
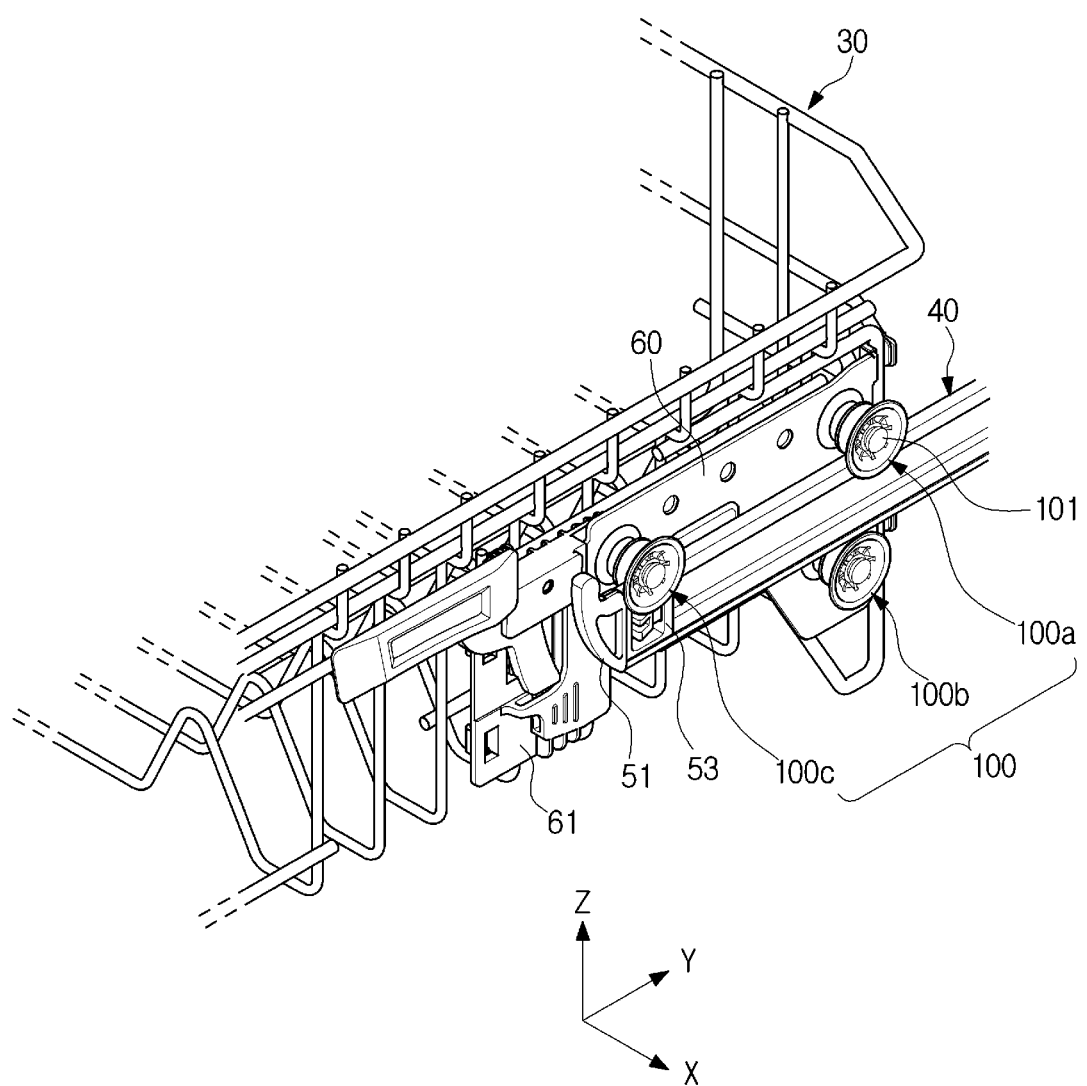
FIG. 3 is an enlarged view of a basket, a rail and rollers in a dish washer according to an embodiment of the disclosure.

FIG. 3 is an enlarged view of a basket, a rail and rollers in a dish washer according to an embodiment of the disclosure.

As shown in FIG. 3, a plurality of basket rollers 100 may be coupled with the bracket 60. The basket rollers 100 may include two upper rollers 100a and 100c and a lower roller 100b. More specifically, the two upper rollers 100a and 100c and the lower roller 100b may be rotatably installed on the bracket 60.

When a rotation shaft 101 penetrates an insertion hole 140a (see FIGS. 4 to 6) of each of the basket rollers 100a to 100c to be coupled with the bracket 60, the bracket rollers 100a to 100c may be rotatably coupled with the bracket 60. The numbers of the upper rollers 100a and 100c and the lower roller 100b may change according to a design specification. However, the basket rollers 100a to 100c may be rotatably coupled directly with the basket 30, without a separate bracket. The upper rollers 100a and 100c and the lower roller 100b may have the same structure.

The upper rollers 100a and 100c may be rested on the upper surface of the rail 40. The upper rollers 100a and 100c may move forward or backward along the upper surface of the rail 40.

The lower roller 100b may be rested on a lower surface of the rail 40. The lower roller 100b may move forward or backward along the lower surface of the rail 40.

The rail 40 may be positioned between the upper rollers 100a and 100c and the lower roller 100b. Because the rail 40 is positioned between the upper rollers 100a and 100c and the lower roller 100b, the rail 40 may be coupled with the basket 30. The upper rollers 100a and 100c may prevent the basket 30 from escaping downward from the rail 40. The lower roller 100b may prevent the basket 30 from escaping upward from the rail 40. That is, because the basket roller 100 includes the upper rollers 100a and 100c and the lower roller 100b, the basket roller 100 may prevent the basket 30 from being separated from the rail 40.

The upper rollers 100a and 100c may rotate in contact with the upper surface of the rail 40, and the lower roller 100b may rotate in contact with the lower surface of the rail 40. Because the upper rollers 100a and 100c and the lower roller 100b are in contact with the upper and lower surfaces of the rail 40, up and down movements of the basket 30 may be reduced. Accordingly, the basket 30 may move forward or backward stably with respect to the rail 40. The bracket 60 may be coupled with the basket 30 through a connection bracket 61. The connection bracket 61 may be coupled with the basket 30, and the bracket 60 may be coupled with the connection bracket 61. That is, the connection bracket 61 may function as a medium for coupling the bracket 60 with the basket 30. However, the bracket 60 may be coupled directly with the basket 30.

Figure 4:
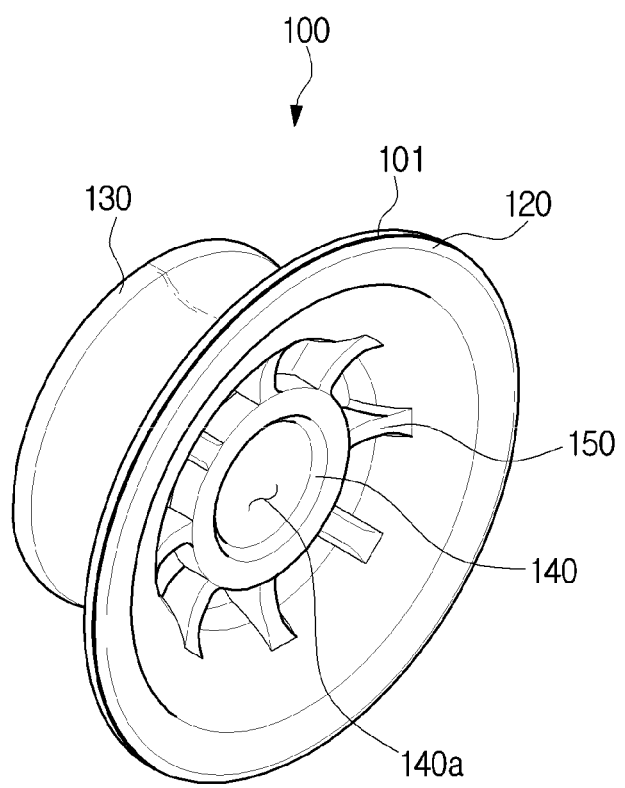
FIG. 4 shows a roller according to an embodiment of the disclosure.
Figure 5:
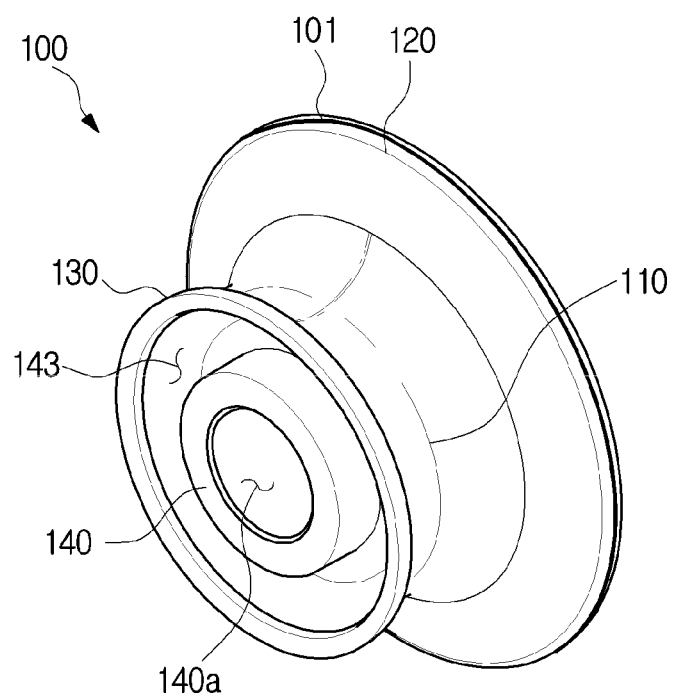
FIG. 5 shows the roller of FIG. 4 as seen at another angle.
Figure 6:
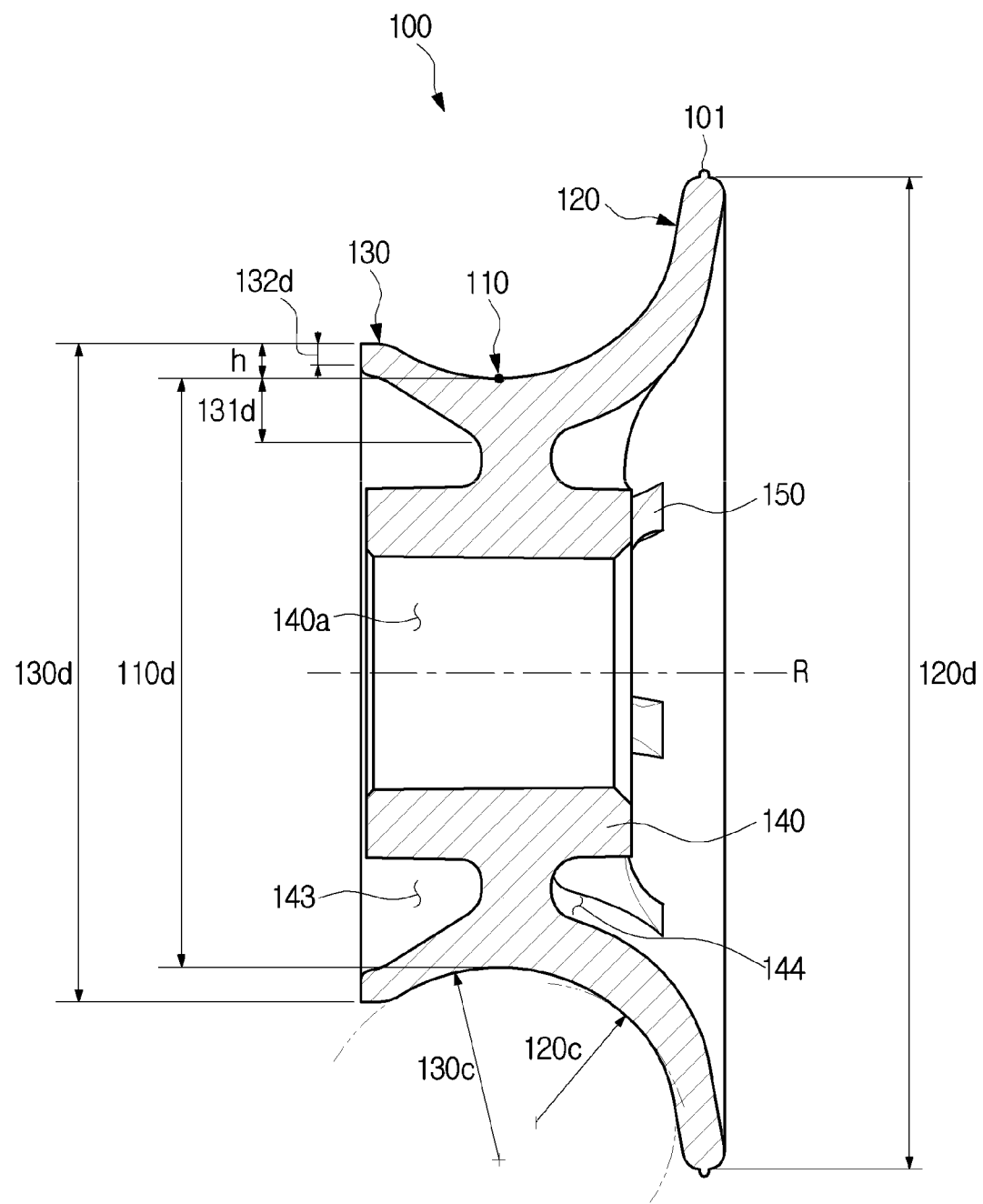
FIG. 6 is a side cross-sectional view of the roller shown in FIG. 4.

FIG. 4 shows a roller according to an embodiment of the disclosure, FIG. 5 shows the roller of FIG. 4 as seen at another angle, and FIG. 6 is a side cross-sectional view of the roller shown in FIG. 4.

Hereinafter, a basket roller according to an embodiment of the disclosure will be described in detail with reference to FIGS. 4 to 6.

Referring to FIGS. 4 to 6, the basket roller 100 may include a first flare portion 120 with a greater diameter at a longer distance in first direction from a predetermined location 110 of the basket roller 100, and a second flare portion 130 with a greater diameter at a longer distance in second direction from the predetermined location 110 of the basket roller 100. The second direction may be opposite to the first direction. The predetermined location 110 may be a location at which the diameter of the basket roller 100 is a minimum. The predetermined location 110 may correspond to a rolling portion that rolls in contact with the rail 40. Hereinafter, the predetermined location 110 will be referred to as a rolling portion.

The rolling portion 110 may be a boundary between the first flare portion 120 and the second flare portion 130.

The first flare portion 120 may prevent the basket roller 100 from escaping in the first direction from the rail 40. The first flare portion 120 may have a greater diameter at a longer distance from the rolling portion 110. More specifically, the diameter of the first flare portion 120 may be a minimum 110d at the rolling portion 110, and a maximum 120d at a first end of the basket roller 100.

The second flare portion 130 may prevent the basket roller 100 from escaping in the second direction from the rail 40, wherein the second direction may be opposite to the first direction. The second flare portion 130 may have a greater diameter at a longer distance from the rolling portion 110. More specifically, the diameter of the second flare portion 130 may be the minimum 110d at the rolling portion 110, and a maximum 130d at a second end of the basket roller 100.

The diameter 120d of the first flare portion 120 may be greater than the diameter 130d of the second flare portion 130. The diameter 120d of the first flare portion 120 may be a maximum external diameter of the first flare portion 120, and the diameter 130d of the second flare portion 130 may be a maximum external diameter of the second flare portion 130. The basket roller 100 may have an asymmetrical shape. Because no burr is formed on the rolling portion 110 due to the asymmetrical shape of the basket roller 100, the basket roller 100 may rotate smoothly, which will be described in detail, later.

The first flare portion 120 may also be referred to as a first wall. Likewise, the second flare portion 130 may be referred to as a second wall. The first wall may be larger than the second wall.

The first flare portion 120 and the second flare portion 130 may have curvatures. In the following description, the expression "great curvature" refers to "great bending".

The curvature 120c of the first flare portion 120 may be greater than the curvature 130c of the second flare portion 130. At the same distance in an axial direction from the rolling portion 110, the diameter of the first flare portion 120 may be greater than that of the second flare portion 130.

The basket roller 100 may further include a plurality of ribs 150 connecting the first flare portion 120 to a shaft coupler 140 to reinforce the strength of the first flare portion 120. The plurality of ribs 150 may be spaced apart from each other along a circumferential direction of the shaft coupler 140.

As shown in FIG. 6, a first recess, or groove, 144 may be formed between the first flare portion 120 and the shaft coupler 140.

Due to the characteristics of injection-molding, a thick injection-molding product may contract. The first groove 144 may reduce the thickness of the first flare portion 120. Therefore, the first groove 144 may prevent the basket roller 100 from contracting during an injection-molding process. Also, the first groove 144 may help a mold move backward in the axial direction of the basket roller 100 when the basket roller 100 is manufactured. However, when the first groove 144 is provided, the thickness of the first flare portion 120 may become thin compared to a case in which the first groove 144 is not provided. As the thickness of the first flare portion 120 is thin, the strength of the first flare portion 120 may be weakened. Accordingly, the plurality of ribs 150 may be provided in the first groove 144 to reinforce the strength of the first flare portion 120. In FIG. 4, eight ribs 150 are provided, however, the number of the ribs 150 may change according to a design specification.

The basket roller 100 may include a second recess 143 recessed in the axial direction between the shaft coupler 140 and the second flare portion 130. A width in a radial direction of the second groove 143 may decrease as a depth in an axial direction of the second groove 143 increases. In other words, an inner surface of the second flare portion 130 forming a part of the second recess 143 may be inclined with respect to the axial direction. Because the inner surface of the second flare portion 130 is inclined with respect to the axial direction, a core may be easily taken out in the axial direction when the basket roller 100 is manufactured. Because the inner surface of the second flare portion 130 is inclined, the second flare portion 130 may have a substantially similar thickness, although the thickness of the second flare portion 130 changes gradually in the axial direction.

The thickness of the second flare portion 130 may be smaller at a longer distance in an axial direction from the rolling portion 110, or may be uniform. Referring to FIG. 6, the thickness of the second flare portion 130 may become a maximum thickness 131d at the rolling portion 110, and decrease gradually in the axial direction so as to become a minimum thickness 132d at the other end of the second flare portion 130. However, a difference between the maximum thickness 131d and the minimum thickness 132d of the second flare portion 130 may not be great. Accordingly, as described above, the second flare portion 130 may have a similar thickness along the axial direction. The thickness of the second flare portion 130 may be thin so that the second flare portion 130 has elasticity. For example, the thickness of the second flare portion 130 may be 3 mm or less. When the thickness of the second flare portion 130 is thick, the elasticity of the second flare portion 130 may deteriorate, and a stripping process may not be used upon manufacturing the basket roller 100. The stripping process is a process of forcibly stripping an injection-molding product from a mold by using the elasticity of the injection-molding product. When the elasticity of an injection-molding product is insufficient, the injection-molding product may be broken so that the stripping process can be not used.

The basket roller 100 may include a burr 101. The basket roller 100 may be manufactured by injection-molding. Due to the characteristics of injection-molding, the basket roller 100 may necessarily include the burr 101. According to a technical idea of the disclosure, the burr 101 may be formed at another location except for the rolling surface of the basket roller 100. The bur 101 may be formed at an area of the first flare portion 120 at which the diameter of the first flare portion 120 is the maximum. That is, the burr 101 may be formed at the first end of the first flare portion 120. The burr 101 may be formed along the circumferential direction of the first flare portion 120.

The basket roller 100 may include the rolling surface that rolls in contact with the rail 40. The rolling surface of the basket roller 100 may include the rolling portion 110, a part of the first flare portion 120, and a part of the second flare portion 130. The rolling surface of the basket roller 100 may occupy a predetermined area in both directions from the rolling portion 110, although it does not have an obvious boundary. Because an area of the first flare portion 120 whose diameter is the maximum is not in contact with the rail 40, the area of the first flare portion 120 may not be the rolling surface of the basket roller 100. Accordingly, when the burr 101 is formed in the area in which the diameter of the first flare portion 120 is the maximum, the burr 101 may be out of the rolling surface of the basket roller 100. When the burr 101, which is a kind of protrusion, is located on the rolling surface of the basket roller 100, the burr 101 may interfere with smooth rotations of the basket roller 100. According to a technical idea of the disclosure, the burr 101 may be located at an area which is not the rolling surface of the basket roller 100, and accordingly, the basket roller 100 may move smoothly on the rail 40.

Figure 7:
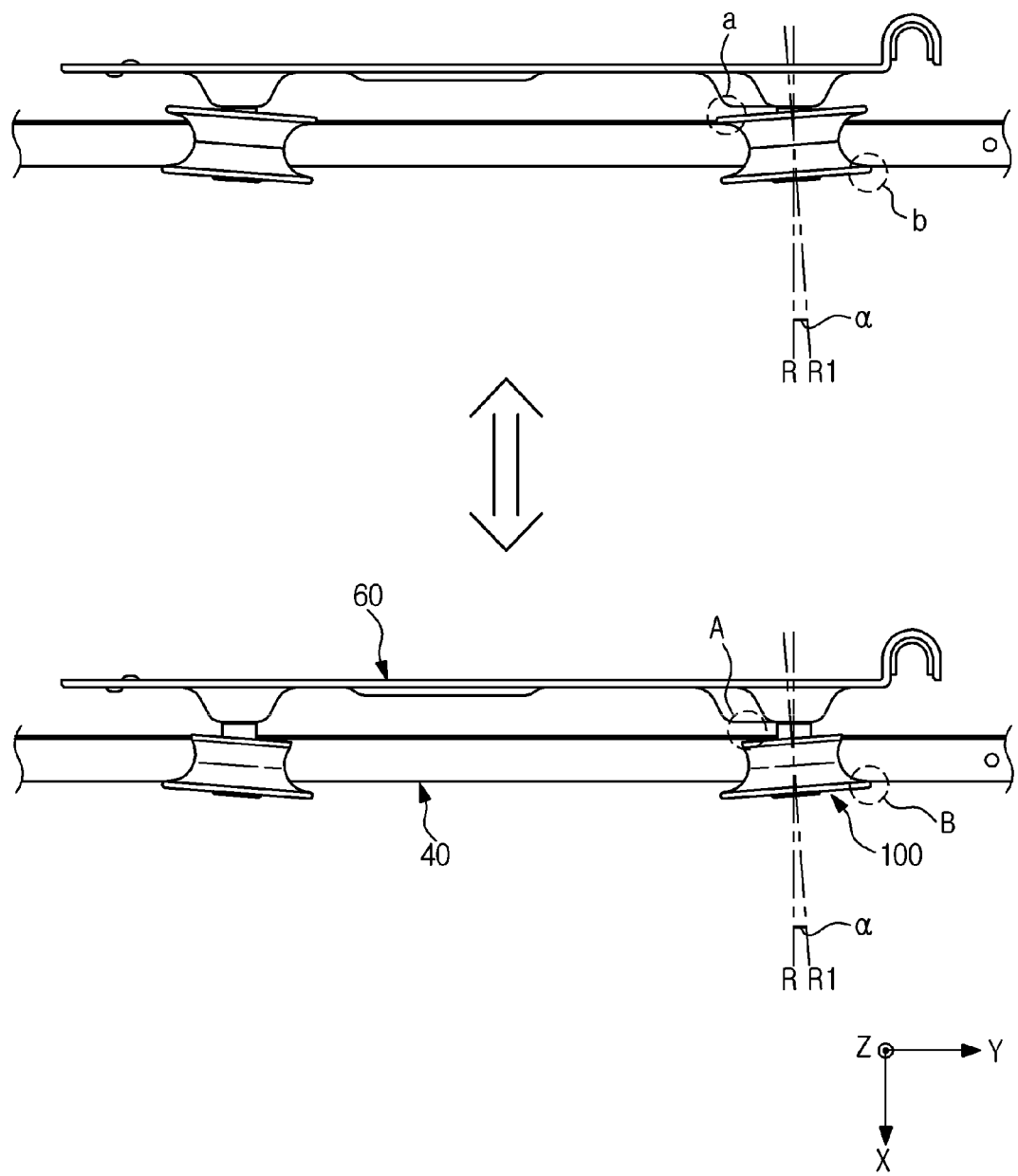
FIGS. 7 and 8 are views for comparing a typical roller with a roller according to an embodiment of the disclosure.
Figure 8:
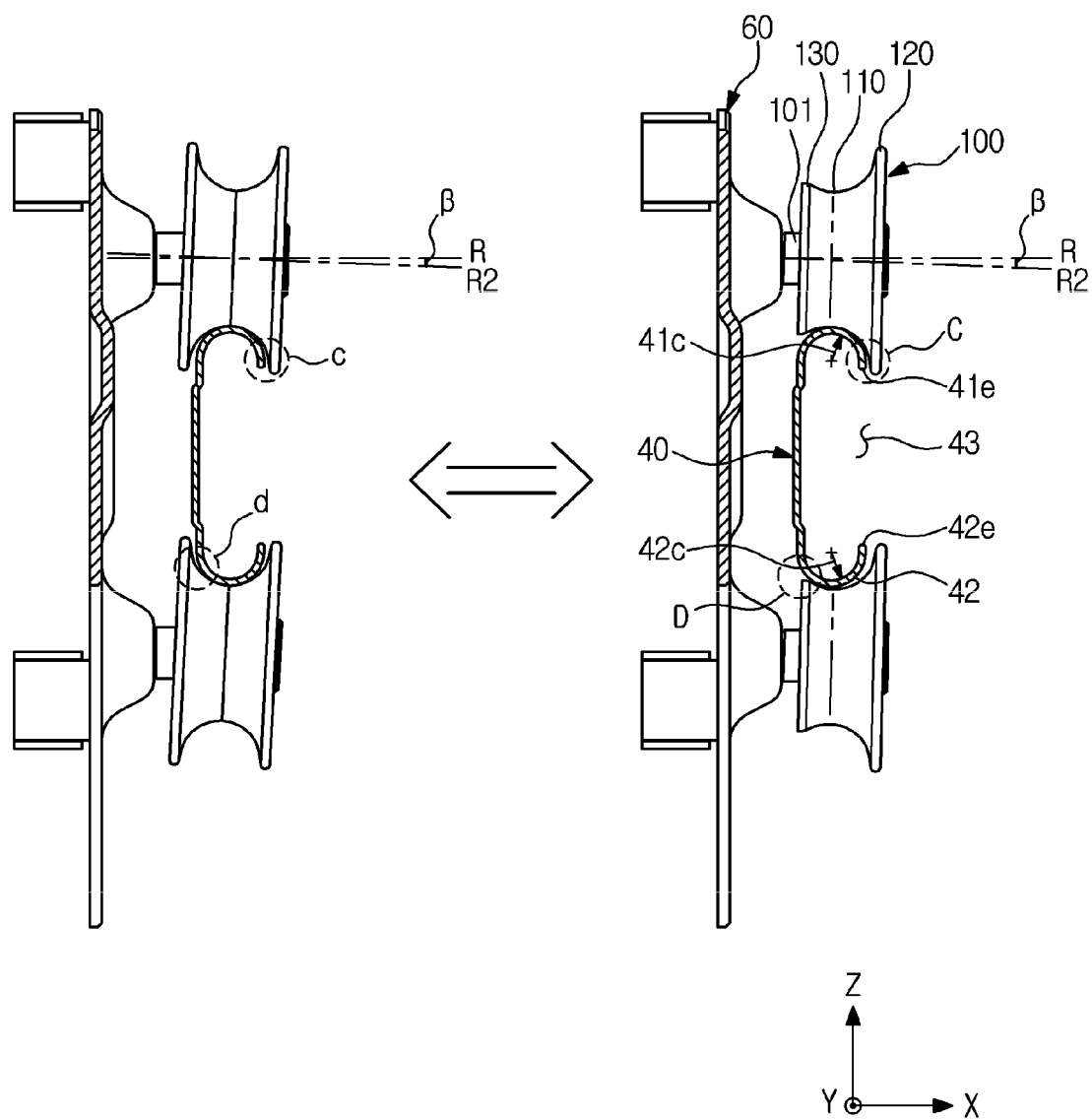

FIGS. 7 and 8 are views for comparing a typical roller with a roller according to an embodiment of the disclosure.

Referring to FIGS. 7 and 8, when a load on the basket 30 increases or when a load on the basket 30 is biased, a real rotation axis R1 of the basket roller 100 may be misaligned from an ideal rotation axis R of the basket roller 100.

As shown in FIG. 7, the real rotation axis R1 may be misaligned by a from the ideal rotation axis R according to a situation, wherein a may be an arbitrary angle.

The basket roller 100 according to an embodiment of the disclosure may reduce interference occurring between the basket roller 100 and the rail 40 compared to a typical basket roller, even when the real rotation axis R1 is misaligned from the ideal rotation axis R.

Referring to FIG. 7, the typical basket roller includes a pair of flare portions having the same height. When a real rotation axis R1 of the typical basket roller is misaligned by a from an ideal rotation axis R of the typical basket roller, the typical basket roller contacts a rail at two areas of a and b. In other words, the typical basket roller interferes with the rail at two flare portions having the same diameter. That is, interference between the typical basket roller and the rail occurs at all the areas of a and b, and accordingly, putting a basket into a case and taking the basket out of the case may be limited. Due to the interference of the basket roller with the rail, a great force may be required to rotate the basket roller or rotating the basket roller may be impossible.

Referring to A and B of FIG. 7, because the basket roller 100 according to an embodiment of the disclosure includes the second flare portion 130 having a smaller diameter than that of the first flare portion 120, no or little interference may occur between the basket roller 100 and the rail 40.

More specifically, referring to A of FIG. 7, because the basket roller 100 includes the second flare portion 130, no interference may occur between the basket roller 100 and the rail 40. Referring to B of FIG. 7, the first flare portion 120 of the basket roller 100 may interfere with the rail 40. The typical basket roller in which the second fare portion has the same diameter as that of the first flare portion may interfere with the rail 40 even at the area of A. Because the basket roller 100 according to an embodiment of the disclosure includes the second flare portion 130 having the smaller diameter than that of the first flare portion 120, interference between the basket roller 100 and the rail 40 may be reduced.

Referring to FIG. 8, the rail 40 may include an upper bending portion 41 bent at an upper end of the rail 40 and a lower bending portion 42 bent at a lower end of the rail 40. An opening 43 may be formed between the upper bending portion 41 and the lower bending portion 42. That is, the rail 40 may be a C-shaped rail. The upper bending portion 41 and the lower bending portion 42 may have the same curvature. A curvature 41c of the upper bending portion 41 and a curvature 42c of the lower bending portion 42 may be greater than a curvature 120c of the first flare portion 120.

As described above, because the rail 40 is a C-shaped rail, the basket roller 100 may move along an upper or lower surface of the rail 40. Also, the rail roller 70 may be positioned in the inside of the rail 40 and move along an inner surface of the rail 40. The C-shaped rail may guide the rollers 100 and 70 on all of the inner and outer surfaces of the rail 40. Thereby, a distance to which the basket 30 is taken out may increase longer than a length of the rail 40.

As shown in FIG. 8, the real rotation axis R2 of the basket roller 100 may be misaligned by β from the ideal rotation axis R of the basket roller 100 due to an excessive or unbalanced load on the basket 30.

Referring to C of FIG. 8, because the curvature of the upper bending portion 41 is greater than the curvature of the first flare portion 120, no excessive friction power may be generated between the basket roller 100 and the upper bending portion 41 even when the real rotation axis R2 of the basket roller 100 may be misaligned from the ideal rotation axis R of the basket roller 100.

Referring to D of FIG. 8, because the maximum diameter of the second flare portion 130 is smaller than the maximum diameter of the first flare portion 120, neither excessive friction nor interference may be generated between the second flare portion 130 and the rail 40 even when the real rotation axis R1 of the basket roller 100 is misaligned from the ideal rotation axis R of the basket roller 100.

Referring to c and d of FIG. 8, in the typical basket roller, the diameter of the second flare portion may be equal to the diameter of the first flare portion. Also, in the typical basket roller, the curvature of the first flare portion may be equal to the curvature of the second flare portion. Also, in the typical basket roller, excessive interference between the flare portion and the rail occurs to interfere with rotations of the basket roller, as shown in c and d of FIG. 8. In this case, the flare portion may be broken due to the interference.

Meanwhile, because the basket roller 100 according to an embodiment of the disclosure includes the second flare portion 130, no excessive interference between the second flare portion 130 and the rail 40 may occur even when the real rotation axis R1 of the basket roller 100 is misaligned from the ideal rotation axis R of the basket roller 100.

Figure 9:
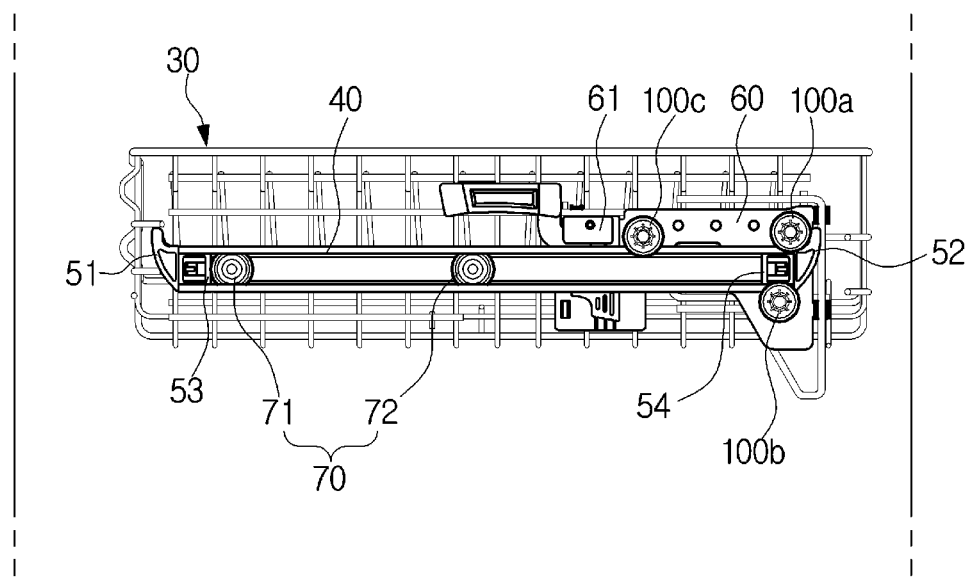
FIGS. 9, 10, and 11 are views for describing an operation of taking a basket out of a dish washer according to an embodiment of the disclosure.
Figure 10:
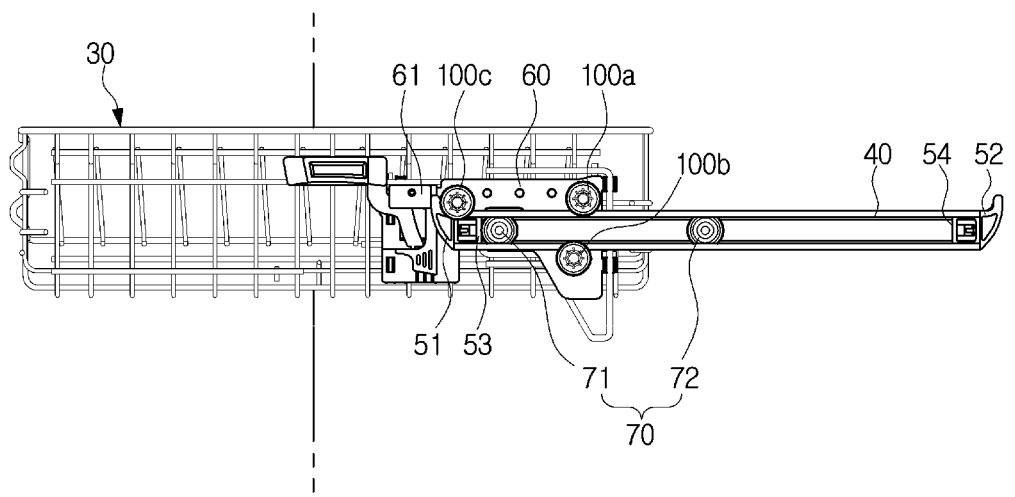
Figure 11:
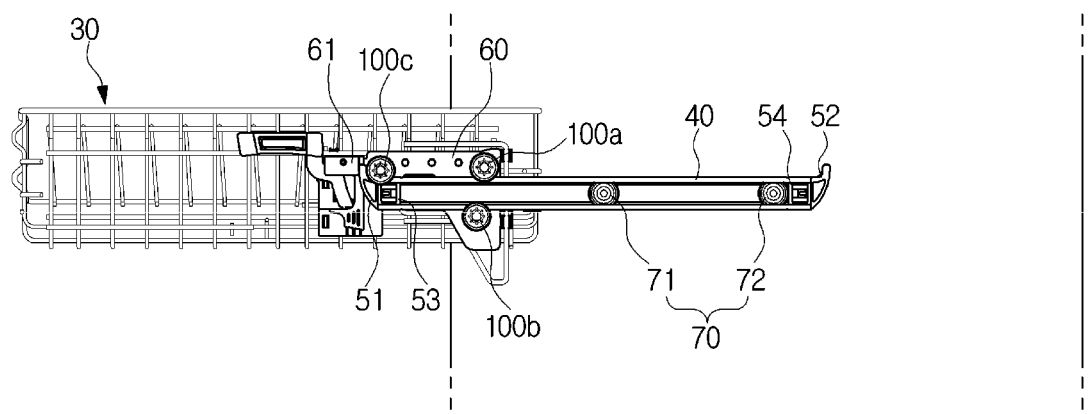

FIGS. 9 to 11 are views for describing an operation of taking a basket out in a dish washer according to an embodiment of the disclosure.

Hereinafter, an operation of taking the basket 30 out by using the rail roller 70, the basket roller 100, the rail 40, and the stoppers 51 to 54 will be described in detail.

At both ends of the rail 40, the stoppers 51 to 54 may be positioned.

The stoppers 51 to 54 may include a first basket stopper 51 and a second basket stopper 52. Also, the stoppers 51 to 54 may include a first rail stopper 53 and a second rail stopper 54.

The first basket stopper 51 and the second basket stopper 52 may limit movements of the basket roller 100.

The first rail stopper 53 and the second rail stopper 54 may limit movements of the rail 40.

Referring to FIG. 9, when the basket 30 is put into the case 10, the first upper roller 100a may be limited in moving backward from the rail 40 by the second basket stopper 53. At this time, the first rail roller 71 may contact the first rail stopper 53, and the rail 40 may be limited in moving backward in the case 10.

Referring to FIG. 10, when the basket 30 is taken out of the case 10, the basket roller 100 may first move forward with respect to the rail 40. Also, the bracket 60 and the basket 30 may move forward from the rail 40, together with the basket roller 100. At this time, the rail 40 may not move. As the basket 30 is taken out of the case 10, the first upper roller 100a may move away from the second basket stopper 52, and the second upper roller 100c may contact the first basket stopper 51.

Referring to FIG. 11, the second upper roller 100c may be limited in moving forward from the rail 40 by the first basket stopper 51. When the basket 30 continues to be taken out of the case 10, the rail roller 70 may rotate, and accordingly, the rail 40 may move forward. As the rail 40 moves forward, the basket 30 may be secondarily taken out of the case 10. As the basket 30 is taken out of the case 10, the first rail roller 71 may move away from the first rail stopper 53, and the second rail roller 72 may contact the second rail stopper 54. When the second rail roller 72 contacts the second rail stopper 54, the basket 30 may be no longer taken out.

Figure 12:
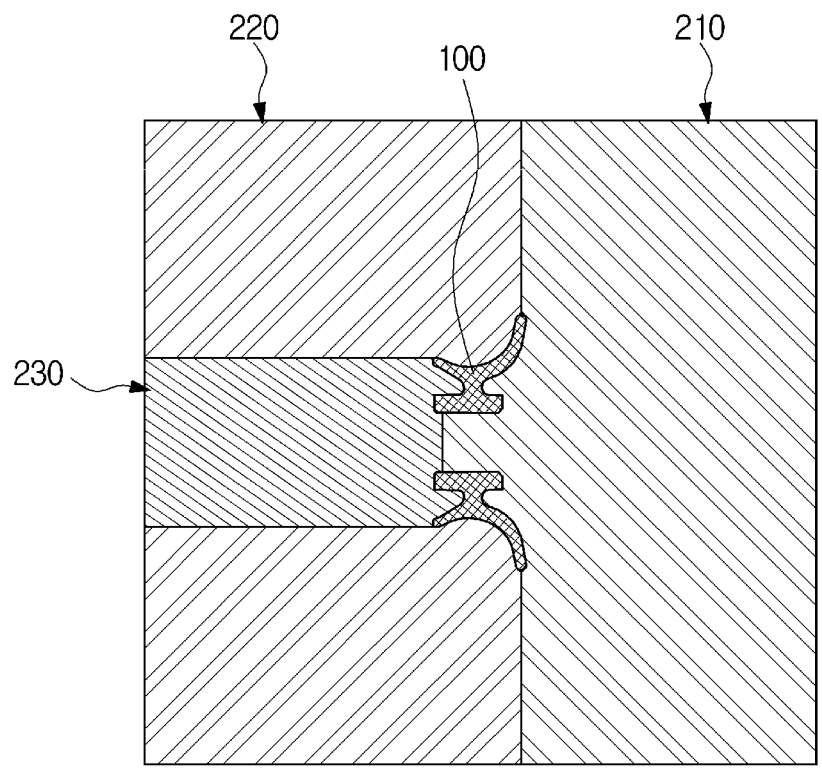
FIG. 12 is a cross-sectional view of a first mold, a second mold, and a core, showing a state in which the first mold, the second mold, and the core are closed and a molten material is injected, in a method of manufacturing a roller according to an embodiment of the disclosure.
Figure 13:
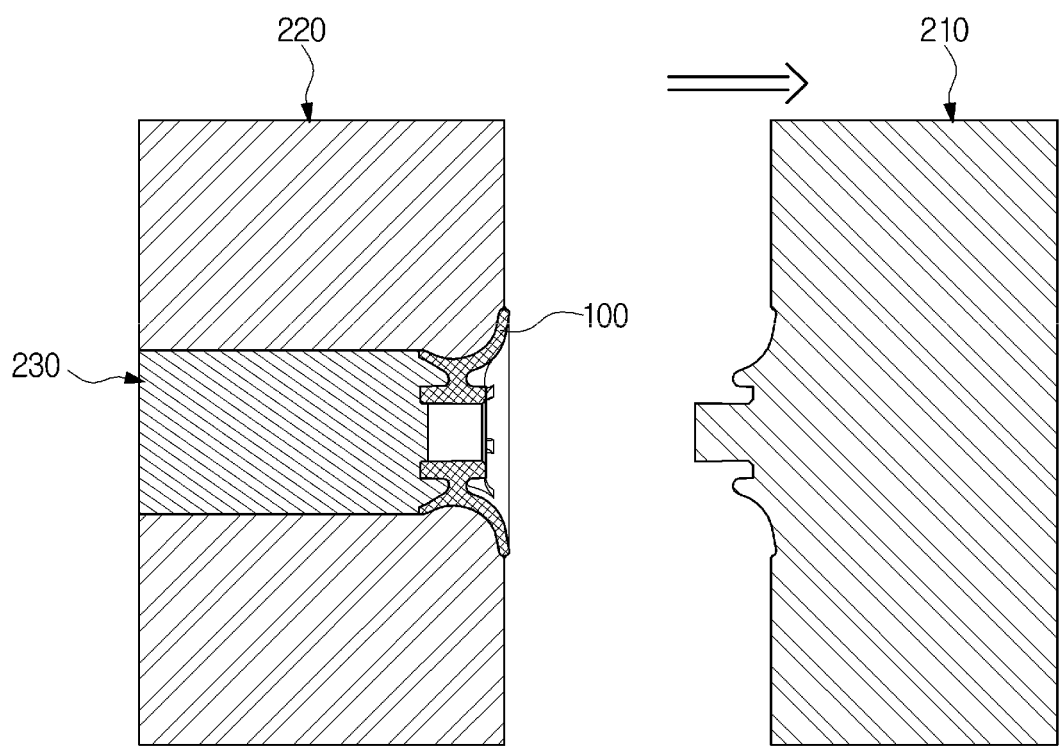
FIG. 13 is a cross-sectional view of a first mold, a second mold, and a core, showing a state in which the first mold is separated from the second mold, in a method of manufacturing a roller according to an embodiment of the disclosure.
Figure 14:
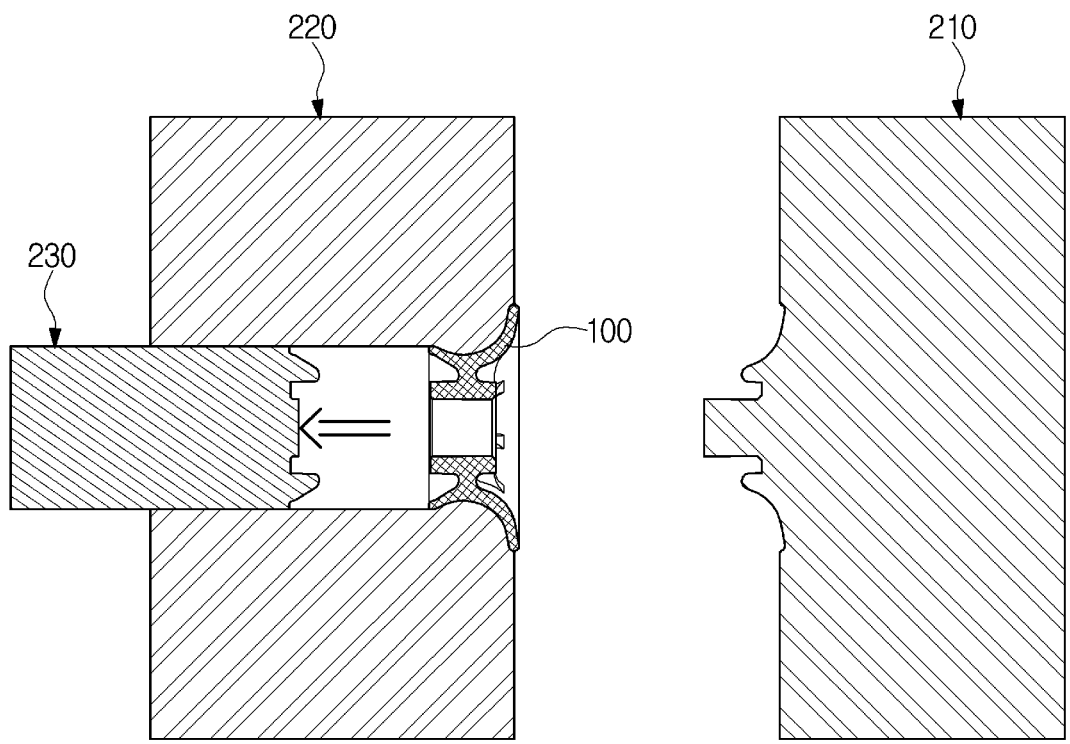
FIG. 14 is a cross-sectional view of a first mold, a second mold, and a core, showing a state in which the core is separated from the second mold, in a method of manufacturing a roller according to an embodiment of the disclosure.
Figure 15:
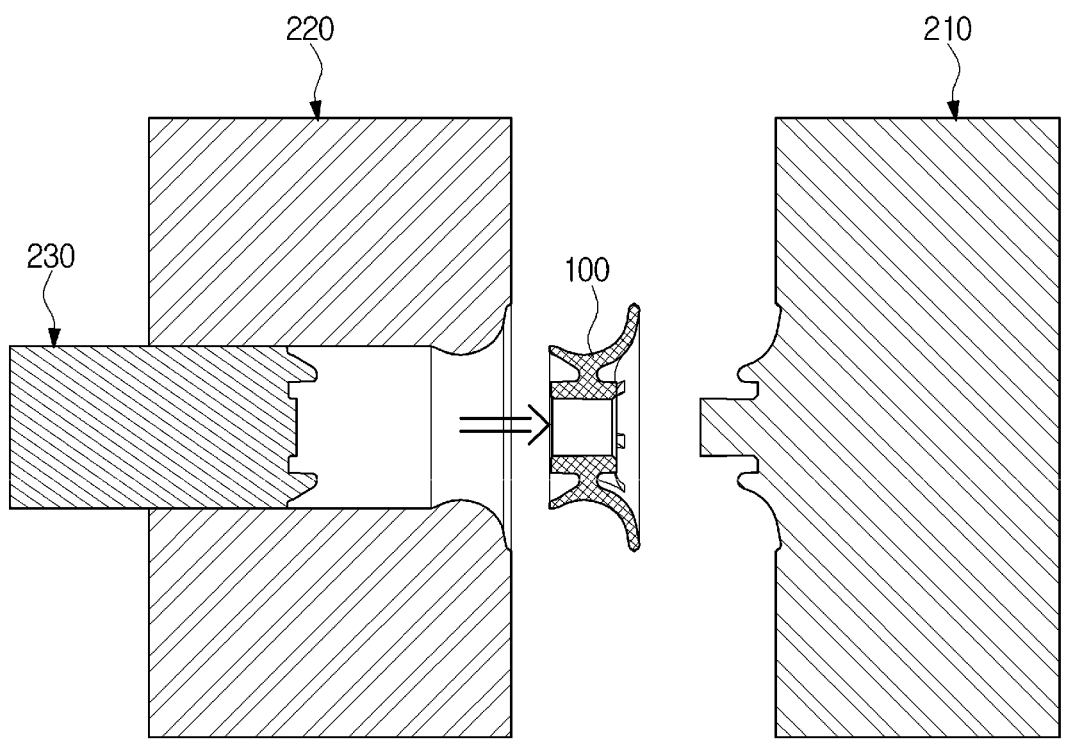
FIG. 15 is a cross-sectional view of a first mold, a second mold, and a core, showing a state in which a roller as an injection-molding product is forcibly separated from the second mold, in a method of manufacturing a roller according to an embodiment of the disclosure.
Figure 16:
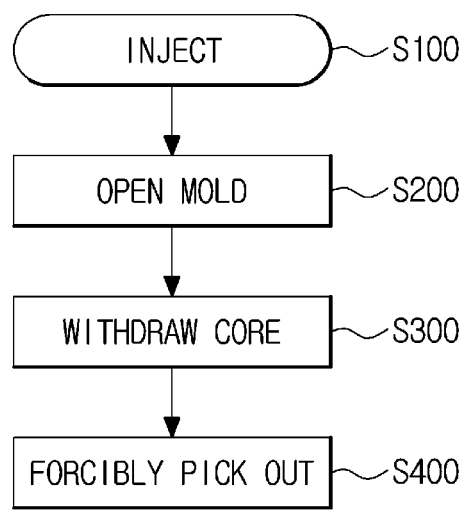
FIG. 16 is a flowchart showing a method of manufacturing a roller according to an embodiment of the disclosure.

FIG. 12 is a cross-sectional view of a first mold, a second mold, and a core, showing a state in which the first mold, the second mold, and the core are closed and a molten material is injected, in a method of manufacturing a roller according to an embodiment of the disclosure. FIG. 13 is a cross-sectional view of a first mold, a second mold, and a core, showing a state in which the first mold is separated from the second mold, in a method of manufacturing a roller according to an embodiment of the disclosure. FIG. 14 is a cross-sectional view of a first mold, a second mold, and a core, showing a state in which the core is separated from the second mold, in a method of manufacturing a roller according to an embodiment of the disclosure. FIG. 15 is a cross-sectional view of a first mold, a second mold, and a core, showing a state in which a roller as an injection-molding product is forcibly separated from the second mold, in a method of manufacturing a roller according to an embodiment of the disclosure. FIG. 16 is a flowchart showing a method of manufacturing a roller according to an embodiment of the disclosure.

Hereinafter, a method of manufacturing a roller according to an embodiment of the disclosure will be described.

The roller 100 may be manufactured by injection-molding. Due to the characteristics of injection-molding, a burr may be formed along a parting line of the roller 100. According to a technical idea of the disclosure, the parting line of the roller 100 may be formed along the circumference of the roller 100. Accordingly, by adjusting the parting line of the roller 100, no burr may be located on the rolling surface of the roller 100.

According to the method of manufacturing the roller according to an embodiment of the disclosure, the roller 100 may be manufactured by a stripping process. The stripping process may be a process of forcibly stripping an injection-molding product from a mold by using the elasticity of the injection-molding product.

Referring to FIG. 12, after a first mold 210, a second mold 220, and a core 230 are closed, a molten material may be injected into an inside space, in operation S100.

The inside space may be in the shape of the roller 100. The first mold 210 and the second mold 220 may form a parting line at an end of the roller 100. Because a burr is formed along the parting line, the burr may be formed at the end of the roller 100.

After a packing process and a cooling process are performed, the first mold 210 may be opened. At this time, the first mold 210 may be separated from the second mold 220 in a first direction that is parallel to the axial direction of the roller 100, in operation S200.

The parting line may be formed on a plane that is orthogonal to a direction in which the first mold 210 is separated. According to a technical idea of the disclosure, the parting line may be formed at one end of the first flare portion 120.

After the first mold 210 is separated from the second mold 220, the core 230 may be separated in a second direction that is opposite to the first direction. That is, the core 230 may be withdrawn, in operation S300.

Finally, the roller 100 as an injection-molding product may be forcibly picked out, in operation S400. A reason of forcibly picking the roller 100 out is because the second mold 220 interferes with the second flare portion 130 (see FIG. 6) when the roller 100 is picked out in the second direction. When the roller 100 has no elasticity, the second flare portion 130 may be broken during a process of forcibly picking the roller 100 out. Also, when the diameter of the second flare portion 130 is too great or the second recess 143 is not provided, the second flare portion 130 may be broken although the roller 100 has elasticity. To prevent the second flare portion 130 from being broken when the roller 100 is forcibly picked out, the second flare portion 130 may have a height h (see FIG. 6) of 2 mm or less.

According to one technical idea of the disclosure, there is provided a roller capable of rotating smoothly without any burr on a rolling surface, a method of manufacturing the roller, and a dish washer including the roller.

According to a technical idea of the disclosure, there is provided a roller capable of rotating smoothly due to its asymmetrical structure even if an error is generated upon assembly of the roller, a method of manufacturing the roller, and a dish washer including the roller.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A dish washer comprising:
   a case including an opening;
   a basket configured to accommodate an item to be washed;
   a rail provided in the case and configured to guide the basket when the basket is drawn into or out of the case on the rail; and
   a basket roller coupled to the basket and configured to rotate relative to the basket to move with the basket along the rail when the basket is put into and taken out of the case on the rail,
   wherein the basket roller includes:
      a rolling portion having a surface configured to be in contact with the rail,
      a first flare portion formed to extend from a first end of the rolling portion and curve away from the first end of the rolling portion along a direction, and
      a second flare portion formed to extend from a second end of the rolling portion and curve away from the second end of the rolling portion along the direction, the second flare portion and the first flare portion forming opposite sides of a space in which the rolling portion contacts the rail while basket roller rotates along the rail,
   wherein an outer circumferential diameter of the first flare portion is greater than an outer circumferential diameter of the second flare portion.

2. The dish washer according to claim 1, wherein the outer circumferential diameter of the first flare portion increases as a distance along the first flare portion from the first end of the rolling portion increases, and
   the outer circumferential diameter of the second flare portion increases as a distance along the second flare portion from the second end of the rolling portion increases.

3. The dish washer according to claim 1, wherein the rolling portion, the first flare portion, and the second flare portion are integrally formed as one body.

4. The dish washer according to claim 1, wherein a radius of curvature of the first flare portion is less than a radius of curvature of the second flare portion.

5. The dish washer according to claim 1, wherein the basket roper further includes:
   a shaft coupler configured to receive a shaft to couple to the basket;
   a first recess provided between the first flare portion and the shaft coupler; and
   a second recess provided between the second flare portion and the shaft coupler.

6. The dish washer according to claim 5, wherein the basket roller further includes a plurality of ribs formed to connect the first flare portion to the shaft coupler to reinforce the first flare portion, the plurality of ribs being spaced apart from each other around an outer circumference of the shaft coupler.

7. The dish washer according to claim 1, wherein a thickness of the second flare portion decreases or remains uniform as a distance along the second flare portion from the second end of the rolling portion increases.

8. The dish washer according to claim 1, wherein the basket roller is injection-molded.

9. The dish washer according to claim 5, wherein an inner surface of the second recess is inclined.

10. The dish washer according to claim 1, further comprising a rail roller rotatably coupled to an inner wall of the case,
  wherein the rail roller is provided between an upper surface of the rail and a lower surface of the rail and configured to rotate relative to the case to guide the rail when the rail is pushed into and pulled out of the case so that the basket is put into and taken out of the case.

11. The dish washer according to claim 10, further comprising a first stopper and a second stopper respectively positioned at a first end and a second end of the rail, and
  the first stopper and the second stopper are configured to limit a range of movement by the basket roller and the rail roller.

12. The dish washer according to claim 11, wherein when the basket is taken out of the case,
  the basket first moves until the basket roller contacts the first stopper, and then moves until the rail roller contacts the second stopper.

13. A basket roller for a basket of a dishwasher, the basket roller comprising:
  a rolling portion having a surface configured to be in contact with a rail;
  a first flare portion formed to extend from a first end of the rolling portion and curve to have an outer circumferential diameter which increases along a direction away from the first end of the rolling portion;
  a second flare portion formed to extend from a second end of the rolling portion and curve to have an outer circumferential diameter which increases along the direction away from the second end of the rolling portion, the second flare portion and the first flare portion forming opposite sides of a space in which the rolling portion contacts the rail while basket roller rotates along the rail; and
  wherein a distance from a rotation axis of the basket roller to an outer periphery of the first flare portion is larger than a distance from the rotation axis of the roller to an outer periphery of the second flare portion.

14. The basket roller according to claim 13, wherein the outer circumferential diameter of the first flare portion at an end of the first flare portion away from the first end of the rolling portion is greater than the outer circumferential diameter of the second flare portion at an end of the second flare portion away from the second end of the rolling portion.

15. The basket roller according to claim 13, wherein a radius of curvature of the first flare portion is less than a radius of curvature of the second flare portion.

16. A method of manufacturing the basket roller of claim 13, the method comprising:
  closing a first mold, a second mold forming a parting line at one end of the roller together with the first mold, and a core;
  injecting a molten material into an injection space formed between the first mold, the second mold, and the core;
  separating the first mold from the second mold in a first direction that is parallel to the rotation axis of the roller such that a burr is formed along an outer circumferential surface of the first flare portion at the end of the first flare portion away from the first end of rolling portion;
  separating the core from the second mold in a second direction that is opposite to the first direction; and
  forcibly picking out the basket roller as an injection-molded product in the s direction from the second mold.

17. A dish washer comprising:
  a case;
  a basket configured to accommodate an item to be washed and to be placed in the case;
  a rail provided in the case; and
  an injection-molded basket roller coupled to the basket and configured to rotate relative to the basket to move with the basket along the rail,
  wherein the injection-molded basket roller includes:
    a substantially concave outer circumferential surface configured to form a space in which the rail is in contact with the substantially concave outer circumferential surface during a movement of the basket along the rail, an outer circumferential diameter of a first end of the substantially concave outer circumferential surface being greater than an outer circumferential diameter of a second end of the substantially concave outer circumferential surface, and
    wherein a burr due to production of the infection-molded basket roller is at a location on the injection-molded basket roller other than the substantially concave outer circumferential surface to thereby prevent the burr from interfering with a rotation of the injection-molded basket roller during the movement of the basket along the rail.

* * * * *

UNITED STATES PATENT AND TRADEMARK OFFICE
CERTIFICATE OF CORRECTION

PATENT NO. : 11,166,619 B2
APPLICATION NO. : 16/502597
DATED : November 9, 2021
INVENTOR(S) : Johannes Buesing et al.

Page 1 of 1

It is certified that error appears in the above-identified patent and that said Letters Patent is hereby corrected as shown below:

In the Claims

Column 12, Line 47:
In Claim 5, delete "roper" and insert --roller--, therefor.

Column 14, Line 19:
In Claim 16, delete "s direction" and insert --first direction--, therefor.

Signed and Sealed this
Fourth Day of January, 2022

Drew Hirshfeld
*Performing the Functions and Duties of the
Under Secretary of Commerce for Intellectual Property and
Director of the United States Patent and Trademark Office*